# United States Patent Office 3,545,042
Patented Dec. 8, 1970

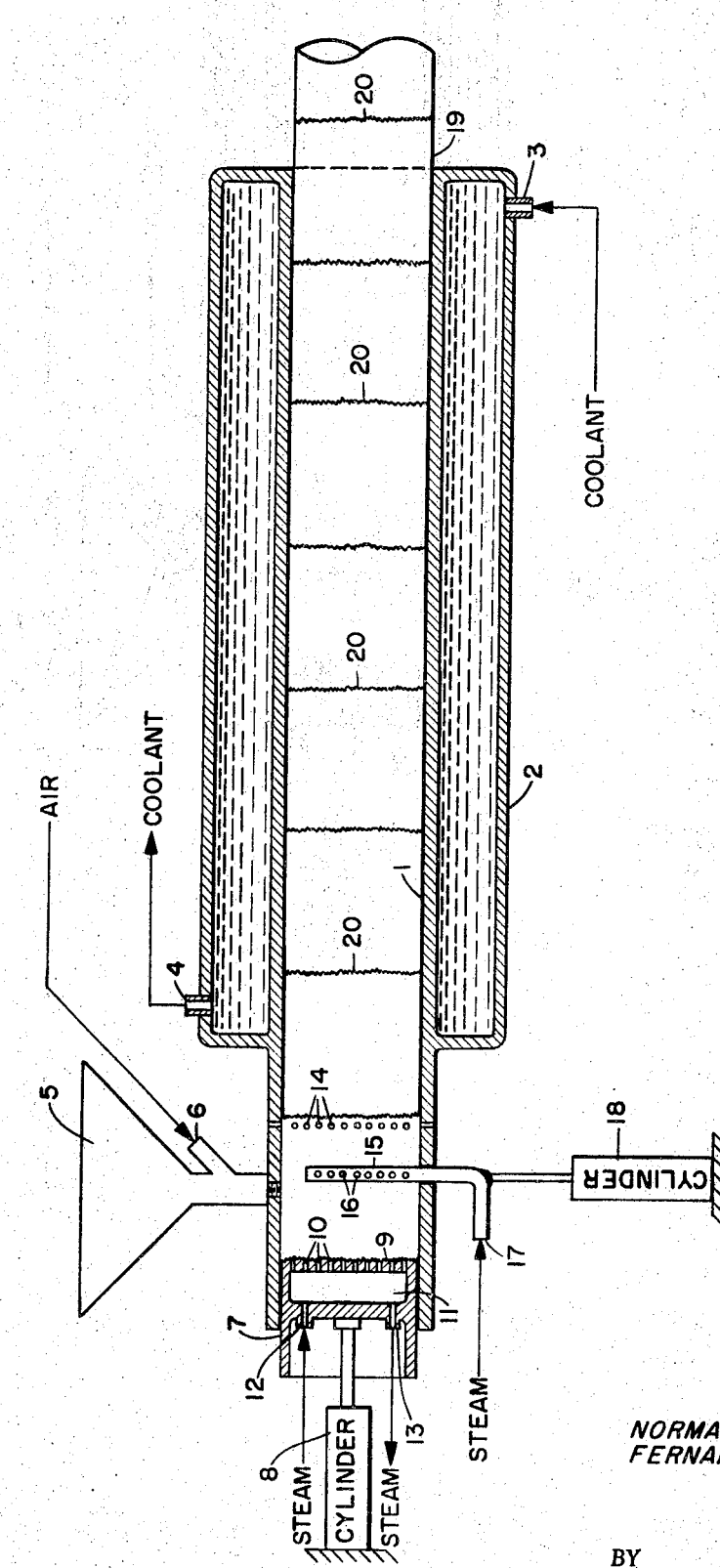

3,545,042
APPARATUS FOR CONTINUOUS MOLDING
Norman J. Brozenick, Solon, and Fernando V. Guerrero, Chagrin Falls, Ohio, assignors to Continental Oil Company, Ponca City, Okla., a corporation of Delaware
Filed Nov. 8, 1968, Ser. No. 774,267
Int. Cl. B29f 3/014
U.S. Cl. 18—12    4 Claims

ABSTRACT OF THE DISCLOSURE

A device for incrementally forming a continuous bar of expanded plastic by softening pre-expanded plastic beads adjacent the roughened face of an existing plastic bar.

---

This invention relates to a device for incrementally forming a continuous bar of expanded plastic.

It is known to produce light-weight plastic blocks by heating beads of plastic which contain a gas-generating agent so that the beads, which are typically partially pre-expanded, will soften and coalesce, and at the same time expand slightly, during the heating. Such production has, however, been a batch operation in the past, with the result that the size of block available is severely limited by mold size convenience.

It is accordingly an object of this invention to provide a device for producing a continuous bar of expanded plastic.

Other aspects, objects, and the several advantages of this invention will become apparent upon study of this disclosure, the appended claims, and the drawing, in which the sole figure represents a view partially in elevation and partially in vertical section of a device according to the invention.

Referring now to the drawing, the device comprises an elongated hollow tube 1 of relatively constant cross-sectional interior dimensions. One end of tube 1 is provided with a surrounding coolant fluid jacket 2 having an inlet port 3 and an exit port 4. Communicating through the wall near the other end of tube 1 is a feed hopper 5 having a gas eduction port 6. This end of tube 1 is provided with a piston 7 connected to a source of lineal power such as a hydraulic cylinder 8. The piston 7 is roughened at its face 9, as by a plurality of small grooves or hemispherical or pyramidal protrusions, and is further provided with a plurality of passages 10 communicating from face 9 to an interior chamber 11. Chamber 11 is further provided with heat exchange fluid inlet and outlet ports 12 and 13 respectively. Spaced around the wall of tube 1 at a point just within the farthest stroke of piston face 9 are a plurality of vent ports 14. Finally, a probe 15 having a plurality of ports 16 can be optionally provided; when used, probe 15 is connected to a fluid inlet 17 and is mounted on a source of lineal power such as a cylinder 18 so that its tip, when retracted, is flush with the interior surface of tube 1. A foamed plastic rod 19, having rough fusion interface joints 20, is shown in position in the device.

Operation of the device is as follows. Hopper 5 is charged with partially pre-expanded beads or particles of plastic containing a gas-generating substance. Cylinder 8, and thus piston 7, is in a retracted position. A cooling medium such as water or air is flowed through chamber 2 by way of inlet port 3 and exit port 4. For start-up, a slide-fitting plug of any suitable material is inserted into tube 1 to a point adjacent ports 14. Plastic beads are then charged into tube 1 from hopper 5 by a propelling gas such as air introduced by way of eduction port 6 until such time as the space within tube 1 between piston face 9 and ports 14 is filled with beads. The propelling gas escapes from tube 1 by way of vent ports 14 and, if desired, by way of passages 10 through chamber 11 and outlet port 13. At this time, a heating fluid such as preferably steam is flowed into the beads by way of inlet port 12, chamber 11, and passages 10. Outlet port 13 can be closed, and thus the steam flows from passages 10 through the interstices of the plastic beads and out vent ports 14, causing the surface of the beads to soften and coalesce, and to expand slightly. When the steam has flowed for a sufficient period of time to effect the desired result, it is shut off, and the porous plastic mass is allowed to cool and solidify. When the plastic has cooled sufficiently, cylinder 8 is actuated to move piston 7 into the tube, pushing the rear edge of the just-formed plastic mass, along with the start-up plug, just beyond vent ports 14. Cylinder 8 and piston 9 are then again retracted, and the operating cycle is repeated. It is impotant to note that the roughened face 9 of piston 7 forms a corresponding rough surface on the trailing face of the just-formed plastic mass. This roughened face is essential to provide sufficient surface area to effect adhesion of adjacent masses of plastic, i.e. to allow the plastic mass within the heating chamber to adhere to the trailing face of the mass just previously formed. As the rod is pushed on out of tube 1, additional cooling is provided by jacket 2. The resulting product is a continuous foamed rod 19 with fused joints 20, which can be cut to any desired length. Use of the optional probe 15 is now described. Probe 15 is extended by way of cylinder 18 through the wall of tube 1 into the heating chamber during the pellet-charging and heating portions of the cycle, and supplies additional heating fluid such as steam by way of inlet 17 and ports 16 which escapes by way of vent ports 14 and, if desired, outlet port 13. Probe 15 is retracted prior to the start of the expansion of the plastic beads, in order that their growth and fusion will fill the void left by the probe.

The interior configuration of tube 1 has been stated as being of substantially constant cross-section; depending upon the shrinkage characteristics upon cooling of the plastic being used, it is sometimes desirable to gradually decrease the cross-sectional dimensions of the tube from the piston end to the discharge end in order to provide sufficient wall friction to the advancing plastic rod as it shrinks upon cooling. It is obvious that the cross-sectional shape of the tube 1, and thus of the rod 19, can be circular, rectangular, or of any desired configuration.

Although this invention has been described with respect to particular embodiments thereof, it is not to be so limited, as changes and modifications may be made therein which are within the spirit and scope of the invention as defined by the appended claims.

What is claimed is:
1. A device for molding a continuous bar of expanded plastic which comprises:
 (a) elongated hollow tube means having a first end and a second end, and of substantially uniform cross-sectional dimensions throughout its length,
 (b) feed means for introducing particulate plastic material into said tube means adjacent said first end,
 (c) piston means slideable within said first end of said tube means, the surface of the face of said piston means being provided with roughening protrusions, and said face of said piston means being further provided with a plurality of fluid passages therethrough,
 (d) means for passing a heating fluid through said fluid passages,
 (e) power means for moving said piston means reciprocally within said tube means, and

(f) fluid passage means through the wall of said tube means at a point adjacent said surface of said piston means when in a position most advanced into said tube means by said power means.

2. The device of claim 1 further provided with cooling means outside of and adjacent said second end of said tube means.

3. The device of claim 1 further provided with perforate probe means moveable transversely of the longitudinal axis of said tube means between a first position within said tube means and a second position outside said tube means at a location within said reciprocal movement of said face, means for moving said probe means between said first and said second positions, and means for supplying a heating fluid to said probe means.

4. The device of claim 1 further provided with means for passing a cooling fluid through said fluid passages.

References Cited
UNITED STATES PATENTS

| | | | |
|---|---|---|---|
| 3,090,075 | 5/1963 | Provenzano et al. | 18—12(P) |
| 3,284,372 | 11/1966 | Bailey | 18—12(P)X |
| 3,354,501 | 11/1967 | Bachman et al. | 18—12(P)X |
| 3,483,597 | 12/1969 | Winkler et al. | 18—12(P) |

WILLIAM S. LAWSON, Primary Examiner